United States Patent [19]

Ashley et al.

[11] 3,824,485

[45] July 16, 1974

[54] STABILIZED OSCILLATOR WITH OUTPUT HAVING HIGH SPECTRAL PURITY

[75] Inventors: James R. Ashley, Colorado Spring, Colo.; Frank M. Palka, Gainesville, Fla.

[73] Assignee: Sperry Rand Corporation, New York, N.Y.

[22] Filed: Apr. 30, 1973

[21] Appl. No.: 355,368

[52] U.S. Cl. .......................... 331/55, 331/53, 331/96

[51] Int. Cl. .......................... H03b 3/06

[58] Field of Search .......................... 331/53, 55, 88, 96, 101, 331/107, 9

[56] References Cited

UNITED STATES PATENTS

| | | | |
|---|---|---|---|
| 2,691,105 | 10/1954 | Schwartz | 331/88 |
| 2,691,138 | 10/1954 | Schwartz | 331/55 |
| 2,820,197 | 1/1958 | Donal, Jr. | 331/55 |
| 3,460,067 | 8/1969 | Burnsweig, Jr. | 331/55 |

OTHER PUBLICATIONS

IRE Trans. on Microwave Theory and Techniques, Mackey, 228–235, July 1962.

*Primary Examiner*—John Kominski
*Attorney, Agent, or Firm*—Howard P. Terry

[57] ABSTRACT

A stable low-noise high frequency signal source comprises a primary high frequency generator stabilized by a high-quality-factor transmission resonator, the primary generator output also being injection phase locked by a stable secondary high frequency quartz crystal controlled generator.

5 Claims, 1 Drawing Figure

PATENTED JUL 16 1974 3,824,485
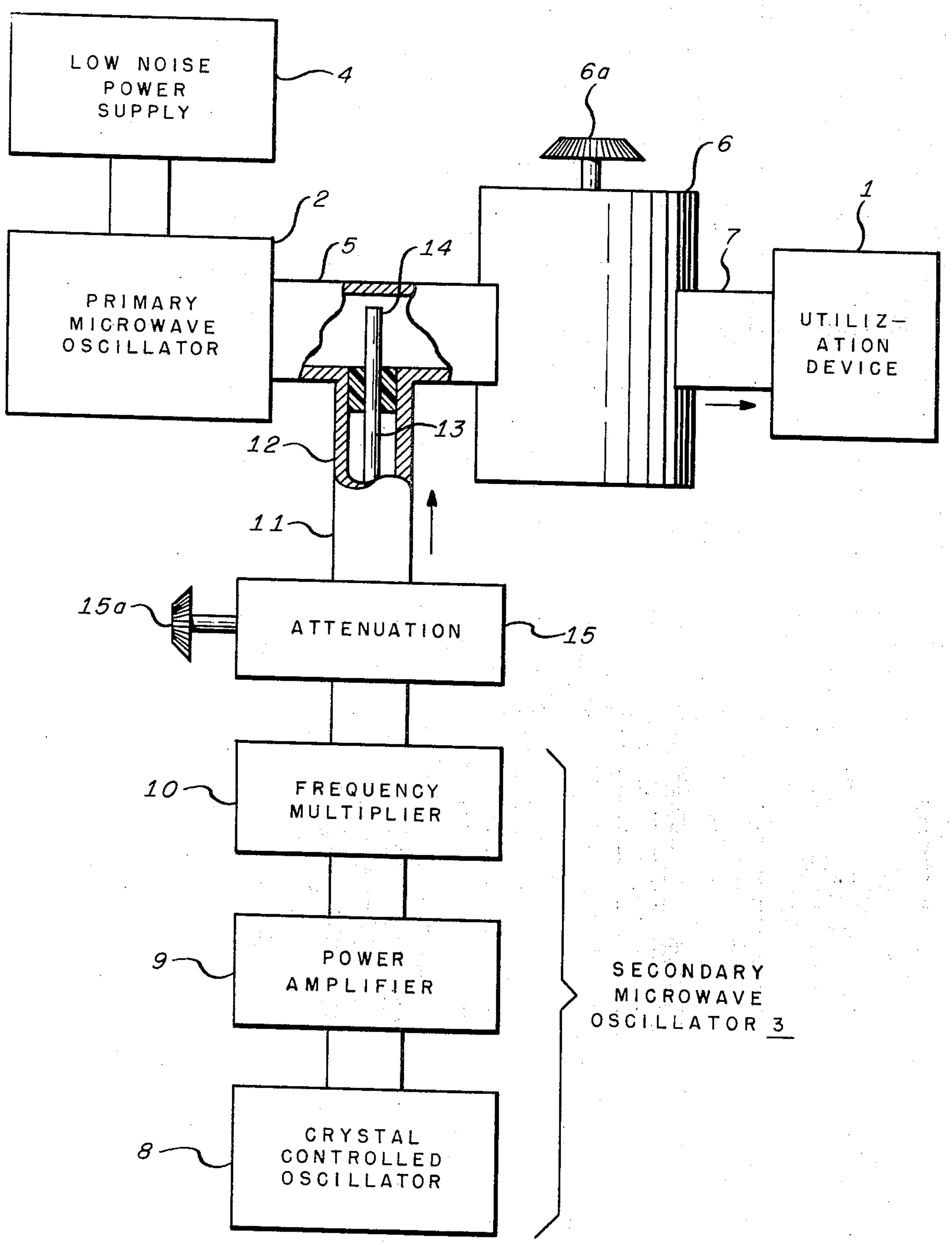

STABILIZED OSCILLATOR WITH OUTPUT HAVING HIGH SPECTRAL PURITY

BACKGROUND OF THE INVENTION

1. Field of the Invention

The invention pertains generally to the field of stable high frequency sources having generated outputs of high spectral purity and is more particularly related to high frequency or microwave signal sources for producing an output stable in frequency and substantially devoid of frequency modulation noise.

2. Description of the Prior Art

There have been requirements in the prior art for signal generator systems which involve signal mixing between very high harmonics of stable high frequency generators with the outputs of other very high frequency generators for producing stable signals in the megahertz band for control or other purposes. For example, in providing frequency and time standards for calibration and other test purposes, the one hundredth harmonic of the output of a microwave source has been heterodyned with the infrared output of an HCN maser to produce a stable 60 MHz beat signal. Such a signal-mixing operation has been undertaken successfully in the Josephson kind of junction, in which the available beat frequency power increases as the intermediate frequency is increased.

To have acceptable spectral purity after such a high order of frequency multiplication, the original signal from the microwave oscillator must have extremely little frequency modulation noise. To maintain a stable beat frequency with the infrared maser, the output of the microwave source, before frequency multiplication, must have a carrier stability at least comparable, for example, to that of a good quartz crystal-controlled oscillator.

Previous systems generally of the foregoing character employed electronic phase locking of a microwave reflex klystron to a harmonic of a crystal-controlled oscillator. However, such prior systems have demonstrated seriously rising levels of frequency modulation noise, degrading the spectral purity of the desired beat frequency signal so that harmonics above the one hundredth harmonic could not be used.

SUMMARY OF THE INVENTION

The present invention relates to stable frequency generators and more particularly to stable microwave frequency sources furnishing a stable output frequency having high spectral purity. The novel device comprises a primary high frequency or microwave generator stabilized by a coupled high-quality-factor resonator, the generator being injection phase locked by a secondary high frequency or microwave generator having crystal-controlled oscillator stability. In its preferred mode of operation, the long term stability of the secondary generator is transferred to the primary microwave high frequency source without introducing the substantial frequency modulation noise characteristic of the prior art. In this manner, the beat frequency between the 401st harmonic of a high frequency or microwave source and the output of a 3.8 THz infrared maser is readily generated.

BRIEF DESCRIPTION OF THE DRAWINGS

The sole FIGURE illustrates the components of the novel signal generator and their preferred interconnections.

DESCRIPTION OF THE PREFERRED EMBODIMENTS

In the sole FIGURE, there is illustrated a novel arrangement for overcoming the problems of the aforementioned prior art system and which successfully supplies high-stability high frequency signals to a utilization device which may include harmonic generator or signal mixer elements. The apparatus of the invention makes use of a primary microwave sine wave oscillator 2 and a secondary microwavesine wave oscillator 3.

The primary microwave oscillator 2 will generally be a conventional reflex klystron, transferred electron oscillator, avalanche transit time oscillator, or other such oscillator of the type normally having superior frequency modulation noise characteristics at modulation frequencies above 10 kHz, though inherently demonstrating undesired low frequency noise below 10kHz and some carrier instability. For best results, operating power is supplied to primary oscillator 2 from a conventional quiet or low noise power supply 4. The output of primary microwave oscillator 2 is coupled by transmission line 5 through the tunable high-quality-factor cavity resonator 6 and thence by wave guide 7 to utilization device 1. Resonator 6 may be highly temperature compensated or may be maintained in a constant temperature environment.

The secondary microwave oscillator 3 comprises a conventional stable crystal-controlled oscillator 8 whose output is amplified, if required, by power amplifier 9 for driving a conventional frequency multiplier 10 for producing a stable high frequency or microwave signal in transmission line 11 consisting of an outer conductor 12 and an inner conductor 13. The outer conductor 12 of transmission line 11 is joined to form a tee-shaped junction with transmission line 5, which latter may be a rectangular wave guide. The inner conductor 13 of transmission line 11 is extended into transmission line 5 as a signal injecting means in the form of a capacitive coupling probe 14. The function of the variable attenuator 15 inserted between frequency multiplier 10 and transmission line 11 remains to be discussed.

The stabilizing high quality factor resonator 6 used to stabilize the primary microwave oscillator 2 is a $TE_{01n}$ right circularly cylindrical tunable cavity resonator where n may range, for example, between 1 and 5 and the unloaded quality factor Q from 10,000 to 50,000. Such conventional cavity resonators are readily available with a fine tuner such as adjustable tuner 6*a*. The primary microwave oscillator 2 is stabilized by the high Q transmission cavity resonator 6 for providing major carrier stability and significant frequency modulation noise reduction by a factor of 20 to 50. The cavity resonator 6 is tightly coupled to oscillator 2 through a short transmission line 5 and must be relatively loosely coupled via transmission line 7 to the load represented by utilization device 1, being preferably substantially undercoupled at about 0.2 times critical coupling.

While the output of the primary microwave oscillator 2 is considerably stabilized by high-Q cavity 6, carrier stability is still inadequate for the purpose of the invention and must be further controlled. The desired improvement according to the present invention is achieved by injection of a stabilizing signal into transmission line 5 between the primary microwave oscillator 2 and the transmission stabilizing cavity resonator 6 via probe 14. In the present invention, the stabilizing signal supplied to probe 14 is generated by the secondary microwave generator. In this manner, the character of the signal fed to utilization device 1 is determined by the carrier stability of the crystal controlled oscillator 8 and by the low level of the frequency modulation noise of the primary microwave oscillator 2 stabilized by the high-quality-factor cavity 6.

The more conventional arrangement for injecting a synchronizing signal via a circulator at the output port of cavity 6 feeding wave guide 7 will not be effective in the present case. In such a configuration, the output port of cavity 6 feeding wave guide 7 is substantially undercoupled; the output port at cavity 6 would therefore reflect a major proportion of the injected signal. Furthermore, any frequency modulation noise riding on the synchronizing signal would be reflected by the output port at cavity 6 and would undesirably appear in the output signal. These problems are alleviated by injection of the coupling 14 between the primary microwave oscillator 2 and cavity resonator 6. In place of coupling the synchronizing signal into the system via probe 14, a directional coupler may be used for injection between the primary oscillator 2 and cavity 6 with orientation such that the synchronizing signal on the coupled arm is directed toward primary oscillator 2. However, for systems requiring high stabilization factors, the added length of transmission line 5 may be objectionable.

In operation, the apparatus is first adjusted for use by coupling a conventional sensitive microwave spectrum analyzer to wave guide 7 in the place of the normal utilization device 1. The primary microwave oscillator 2 is energized and is permitted to reach thermal equilibrium. Next, the operator, while watching the display of the spectrum analyzer, injects the synchronizing signal via probe 14 and the stabilizing cavity resonator 6 is tuned by operating tuner adjustment 6*a* to bring the frequency of primary oscillator 2 within the locking range of the synchronizing signal arriving on probe 14. The power level of the synchronizing signal is adjusted by operating the adjustment 15*a* of microwave attenuator 15 to maintain carrier stability without adding frequency modulation noise. For example, if the injection signal has insufficient level, the locking band width is not adequate to compensate for power supply and thermally induced drifts in the carrier frequency of the primary microwave oscillator 2. On the other hand, if the level of the injected signal is too high, the frequency modulation noise suppression of the stabilizing cavity resonator 6 will be partially defeated, and the frequency modulation noise of the output signal in wave guide 7 will rise in the range of noise frequencies above 20 kHz. At the appropriate setting of power adjustment 15*a*, these problems are minimized and the spectrum analyzer may then be replaced with utilization equipment 1 as described in the foregoing. In practice, it is found that the range of substantially optimum injection power level setting is moderately wide, being of the order of 10 dB.

Accordingly, the invention is a stable microwave frequency source for furnishing a stable noise-free output signal, the signal source comprising a primary microwave generator stabilized by a high-quality-factor cavity resonator, the generator being injection locked by a secondary microwave source which is highly stable in phase, being controlled by a quartz crystal-controlled oscillator. The device is characterized by extremely low frequency modulation noise by virtue of the stabilizing high-quality-factor transmission cavity resonator. Further, the device provides excellent carrier stability by virtue of the crystal-controlled secondary oscillator and the simple manner of injection of its highly stable output signal between the primary oscillator and the stabilizing cavity resonator. The stability and complexity problems associated with phase locked loops are avoided.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. Stable signal generator means comprising:

primary high frequency oscillator means having an output port, low-noise power supply means for exciting said high frequency oscillator means, tunable stabilizing high-quality-factor transmission cavity resonator means having first and second ports, transmission line means for tightly coupling said output port to said first port, utilization means responsive to said second port, secondary high frequency oscillator means for providing a frequency stable output, and transmission line signal injection means coupling said frequency stable output into said transmission line means for tightly coupling said output port to said first port.

2. Apparatus as described in claim 1 wherein said secondary high frequency oscillator means comprises in series relation:

crystal controlled oscillator means, and frequency multiplier means.

3. Apparatus as described in claim 2 wherein said tunable stabilized high-quality-factor transmission cavity resonator means comprises a $TE_{01n}$ cavity resonator.

4. Apparatus as described in claim 3 including adjustable high frequency attenuator means disposed in series relation between said frequency multiplier means and said transmission line signal injection means.

5. Apparatus as described in claim 4 wherein said transmission line signal injection means comprises capacitive probe means.

* * * * *